(12) United States Patent
Kasama (10) Patent No.: US 8,744,802 B2
(45) Date of Patent: *Jun. 3, 2014

(54) MOBILE TERMINAL AND STEP LENGTH-CALCULATING METHOD

(75) Inventor: Koichiro Kasama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/137,414

(22) Filed: Aug. 12, 2011

(65) Prior Publication Data

US 2011/0300835 A1 Dec. 8, 2011

Related U.S. Application Data

(63) Continuation of application No. 12/320,216, filed on Jan. 21, 2009.

(30) Foreign Application Priority Data

May 29, 2008 (JP) ................................. 2008-140481

(51) Int. Cl.
| | |
|---|---|
| *G01B 5/02* | (2006.01) |
| *G01B 5/18* | (2006.01) |
| *G01B 7/02* | (2006.01) |
| *G01B 7/14* | (2006.01) |
| *G01B 11/02* | (2006.01) |
| *G01B 11/14* | (2006.01) |
| *G01B 13/02* | (2006.01) |
| *G01B 21/02* | (2006.01) |
| *G01C 22/00* | (2006.01) |

(52) U.S. Cl.
USPC .... 702/158; 702/160; 455/456.1; 342/357.57

(58) Field of Classification Search
None
See application file for complete search history.

(56) References Cited

U.S. PATENT DOCUMENTS

| | | | | |
|---|---|---|---|---|
| 6,032,108 | A * | 2/2000 | Seiple et al. | 702/97 |
| 7,822,547 | B2 * | 10/2010 | Lindroos | 701/211 |
| 2003/0102578 | A1 * | 6/2003 | Gordon | 261/26 |
| 2003/0189784 | A1 * | 10/2003 | Galloway | 360/78.06 |
| 2007/0135994 | A1 * | 6/2007 | Unuma et al. | 701/207 |
| 2008/0068559 | A1 * | 3/2008 | Howell et al. | 351/158 |
| 2008/0114538 | A1 * | 5/2008 | Lindroos | 701/208 |

\* cited by examiner

Primary Examiner — Magdi Elhag
(74) Attorney, Agent, or Firm — Staas & Halsey LLP (57) ABSTRACT

A mobile terminal which makes it possible to automatically calculate a step length of a user with accuracy. A step count-acquiring section acquires a step count of the user of a mobile terminal. A position calculating section calculates a position of the mobile terminal. A center position-calculating section calculates a center position of a plurality of positions calculated by the position calculating section. A covered distance-calculating section calculates a distance covered by the mobile terminal based on a plurality of the center positions calculated by the center position-calculating section. A step length-calculating section calculates the step length based on the step count acquired by the step count-acquiring section and the covered distance calculated by the covered distance-calculating section.

6 Claims, 9 Drawing Sheets

DISTANCE CORRECTION TABLE

26

| PLACE NAME | LATITUDE-LONGITUDE | DISTANCE |
|---|---|---|
| SAPPORO | NORTH LATITUDE 43° 04' 24"<br>EAST LONGITUDE 141° 20' 24" | ONE SECOND OF LATITUDE CORRESPONDS TO 0.031 km<br>ONE SECOND OF LONGITUDE CORRESPONDS TO 0.023 km |
| ⋮ | ⋮ | ⋮ |
| TOKYO | NORTH LATITUDE 35° 32' 56"<br>EAST LONGITUDE 139° 47' 02" | ONE SECOND OF LATITUDE CORRESPONDS TO 0.031 km<br>ONE SECOND OF LONGITUDE CORRESPONDS TO 0.025 km |
| ⋮ | ⋮ | ⋮ |
| NAHA | NORTH LATITUDE 26° 12' 27"<br>EAST LONGITUDE 127° 41' 12" | ONE SECOND OF LATITUDE CORRESPONDS TO 0.031 km<br>ONE SECOND OF LONGITUDE CORRESPONDS TO 0.028 km |

STEP LENGTH
27 COEFFICIENT TABLE

| STEP COUNT (STEP COUNT/min.) | STEP LENGTH COEFFICIENT (Wc) |
|---|---|
| 68 | 1.00 |
| 80 | 1.02 |
| 91 | 1.05 |
| 100 | 1.09 |
| 106 | 1.15 |
| 110 | 1.24 |
| 115 | 1.30 |
| 122 | 1.34 |
| 126 | 1.40 |
| 130 | 1.46 |
| 135 | 1.51 |
| 145 | 1.50 |
| 170 | 1.36 |

MOBILE TERMINAL AND STEP LENGTH-CALCULATING METHOD

CROSS-REFERENCE TO RELATED APPLICATIONS

This is a continuation application claiming the benefit under 35 U.S.C. §120 of U.S. patent application Ser. No. 12/320,216, entitled MOBILE TERMINAL AND STEP LENGTH-CALCULATING METHOD, filed Jan. 21, 2009, now pending, which is hereby incorporated by reference in its entirety in this application.

This application is based upon and claims the benefits of priority from the prior Japanese Patent Application No. 2008-140481, filed on May 29, 2008, the entire contents of which is incorporated herein by reference.

BACKGROUND OF THE INVENTION

1. Field of the Invention

This invention relates to a mobile terminal and a step length-calculating method, and more particularly to a mobile terminal and a method of calculating a step length of a user.

2. Description of the Related Art

Nowadays, a cellular phone comes to be equipped with lots of functions, and there have been proposed ones which calculate consumed calories and the amount of burned fat of the user. For example, a cellular phone calculates a distance over which the user walked based on a step length input by the user and a step count (the number of steps counted) by a pedometer incorporated therein, and then calculates consumed calories and the amount of burned fat of the user.

One of parameters based on which consumed calories and the amount of burned fat of a user are calculated is the step length of the user. Therefore, to accurately calculate consumed calories and the amount of burned fat, the user is required to input an accurate step length of his/hers to the cellular phone.

It should be noted that, conventionally, there has been proposed a moving position measuring device which causes signals to be sent and received between a moving station and at least three fixed stations set respective locations, for determining relative distances therebetween, whereby a host station determines the position of the moving position by computation processing and sends the position to the moving station (see e.g. Japanese Laid-Open Patent Publication No. 09-90014).

However, if an accurate step length cannot be input e.g. due to the user not knowing an accurate step length of his/her own, there arises a problem that the calculation of consumed calories and the amount of burned fat of the user has an error.

SUMMARY OF THE INVENTION

The present invention has been made in view of the above-described problems, and an object thereof is to provide a mobile terminal and a step length-calculating method which are capable of automatically calculating a step length with accuracy.

To attain the above object, the present invention provides a mobile terminal for calculating a step length of a user. The mobile terminal comprises a step count-acquiring section to acquire a step count of the user, a position calculating section to calculate a position of the mobile terminal, a center position-calculating section to calculate a center position of a plurality of the positions calculated by the position calculating section, a covered distance-calculating section to calculate a distance covered by the mobile terminal based on a plurality of the center positions calculated by the center position-calculating section, and a step length-calculating section to calculate the step length based on the step count acquired by the step count-acquiring section and the covered distance calculated by the covered distance-calculating section.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The invention will now be described in detail with reference to drawings showing preferred embodiments thereof.

Figure 1:
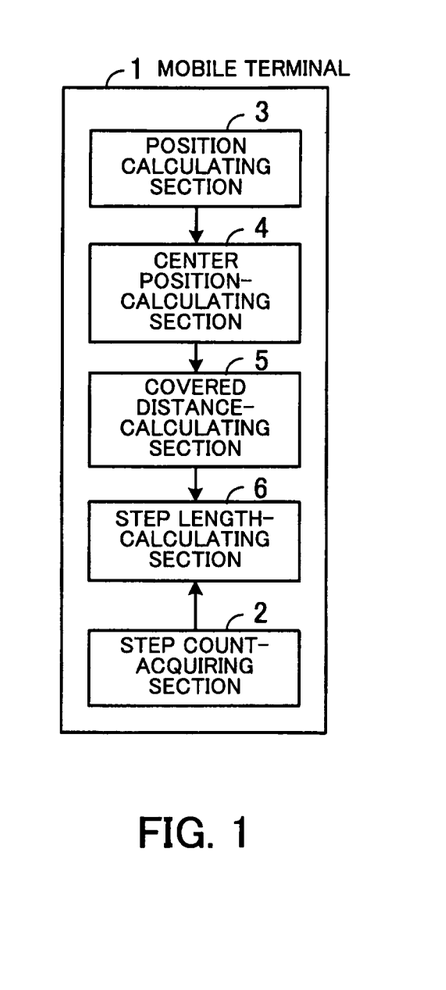
FIG. 1 is a view showing an outline of a mobile terminal.

FIG. 1 is a diagram showing an outline of a mobile terminal. As shown in FIG. 1, the mobile terminal 1 comprises a step count-acquiring section 2, a position calculating section 3, a center position-calculating section 4, a covered distance-calculating section 5, and a step length-calculating section 6.

The step count-acquiring section 2 acquires a step count of a user (the number of steps). The step count-acquiring section 2 is implemented e.g. by a pedometer, and acquires the step count of the user every one minute.

The position calculating section 3 calculates a position of the mobile terminal 1. The position calculating section 3 receives e.g. a GPS (Global Positioning System) signal, and calculates the position of the mobile terminal 1 at a repetition period of 0.1 seconds.

The center position-calculating section 4 calculates a center position of a plurality of positions calculated by the position calculating section 3. For example, the center position-calculating section 4 calculates a center position of ten samples of position calculated by the position calculating section 3 every one minute. Thus, since the mobile terminal 1 calculates a center position from a plurality of samples of position calculated by the position calculating section 3, even when the positions calculated by the position calculating section 3 contain errors, it is possible to approximate the calculated center position to an accurate actual position of the mobile terminal 1.

The covered distance-calculating section 5 calculates a distance covered by the mobile terminal 1 based on a plurality of center positions calculated by the center position-calculating section 4. For example, the covered distance-calculating section 5 calculates a distance covered by the mobile terminal 1 from 60 samples of center position calculated by the center position-calculating section 4. More specifically, distances between respective adjacent ones of the 60 samples of center position are calculated, and added up to thereby calculate a distance covered by the mobile terminal 1 for one minute.

The step length-calculating section 6 calculates the step length of the user based on a step count acquired by the step count-calculating section 2, and the covered distance calculated by the covered distance-calculating section 5. For example, the step length-calculating section 6 calculates the step length of the user by dividing the distance covered by the user for one minute, which is calculated by the covered distance-calculating section 5, by the step count of the user for one minute, which is acquired by the step count-acquiring section 2.

Thus, the mobile terminal 1 automatically calculates the step count of the user and the position of the mobile terminal 1 by the step count-acquiring section 2 and the position calculating section 3. The mobile terminal 1 calculates a center position close to an actual position of the mobile terminal 1 from a plurality of the calculated positions, and calculates a distance over covered by the mobile terminal based on thus calculated center positions. This makes it possible for the mobile terminal 1 to automatically calculate the step length of the user with accuracy.

Next, the embodiment of the present invention will be described in detail with reference to the drawings.

Figure 2:
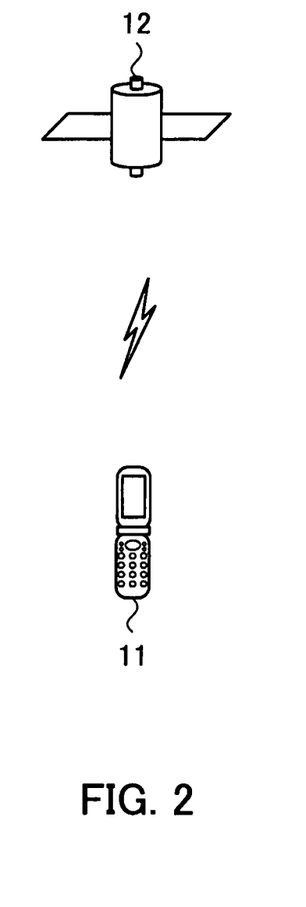
FIG. 2 is a view showing an example of a system configuration of a mobile terminal system.

FIG. 2 is a view showing an example of a system configuration of a mobile terminal system. FIG. 2 shows a mobile terminal 11 and a GPS satellite 12. The mobile terminal 11 is e.g. a cellular phone.

The cellular phone 11 has a function of calculating consumed calories and the amount of burned fat of the user, and displaying the same on a display screen thereof. The user, who does exercise, such as walking, while carrying the mobile terminal 11, can know his/her consumed calories and amount of burned fat.

One of parameters based on which the consumed calories and the amount of burned fat of a user are calculated is the step length of the user. The mobile terminal 11 has a function of accurately calculating the step length of the user. Therefore, the user can automatically obtain his/her accurate consumed calories and amount of burned fat without being required to input an accurate step length of his/hers for himself/herself.

The mobile terminal 11 receives the GPS signal from the GPS satellite 12. The mobile terminal 11 calculates the position of its own from the received GPS signal, and calculates a distance covered by the mobile terminal 11. Further, the mobile terminal 11 has a pedometer. The mobile terminal 11 automatically calculates the step length of the user based on the distance covered thereby and the step count of the user counted by the pedometer.

Figure 3:
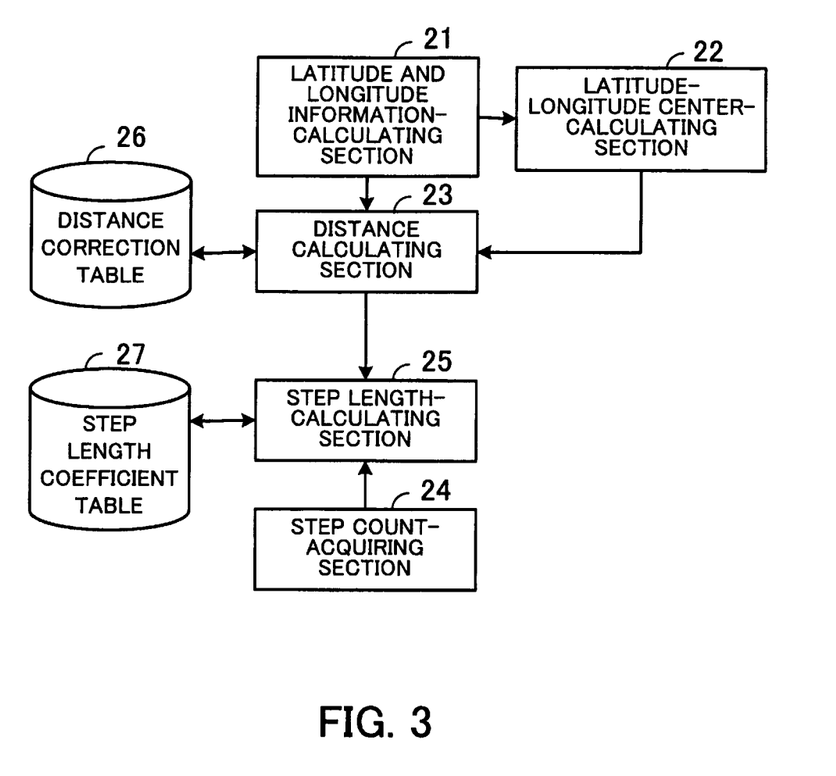
FIG. 3 is a functional block diagram of the mobile terminal.

FIG. 3 is a functional block diagram of the mobile terminal 1. As shown in FIG. 3, the mobile terminal 11 comprises a latitude and longitude information-calculating section 21, a latitude-longitude center-calculating section 22, a distance calculating section 23, a step count-acquiring section 24, a step length-calculating section 25, a distance correction table 26, and a step length coefficient table 27.

The sections of the mobile terminal 11 shown in FIG. 3 are realized by a CPU (Central Processing Unit) of the mobile terminal 11 executing an application stored in a storage device thereof, for calculation of a step length. Further, the sections shown in FIG. 3 can also be realized by a dedicated semiconductor device. The distance correction table 26 and the step length coefficient table 27 are stored in a storage device, such as a flash memory.

The latitude and longitude information-calculating section 21 calculates an actual latitude and longitude of the mobile terminal 11 based on the GPS signal received from the GPS satellite 12. The latitude and longitude information-calculating section 21 receives the GPS signal at a predetermined repetition period to calculate the latitude and longitude, and deliver a predetermined number of latitudes-longitude pairs to the latitude-longitude center-calculating section 22 upon calculation thereof.

For example, the latitude and longitude information-calculating section 21 receives the GPS signal every 0.1 seconds, and calculate a latitude-longitude pair. Then, upon calculation of ten samples (corresponding to one minute) of the latitude-longitude pair, the latitude and longitude information-calculating section 21 delivers the calculated ten samples to the latitude-longitude center-calculating section 22.

The latitude-longitude center-calculating section 22 calculates the center of the predetermined number of latitude-longitude pairs delivered from the latitude and longitude information-calculating section 21, and identifies the position of the mobile terminal 11. For example, the latitude-longitude center-calculating section 22 determines the center (average) of a predetermined number of latitudes delivered from the latitude and longitude information-calculating section 21, and then determines the center of a predetermined number of longitudes delivered from the same, to thereby identify the position of the mobile terminal 11.

Figure 4:
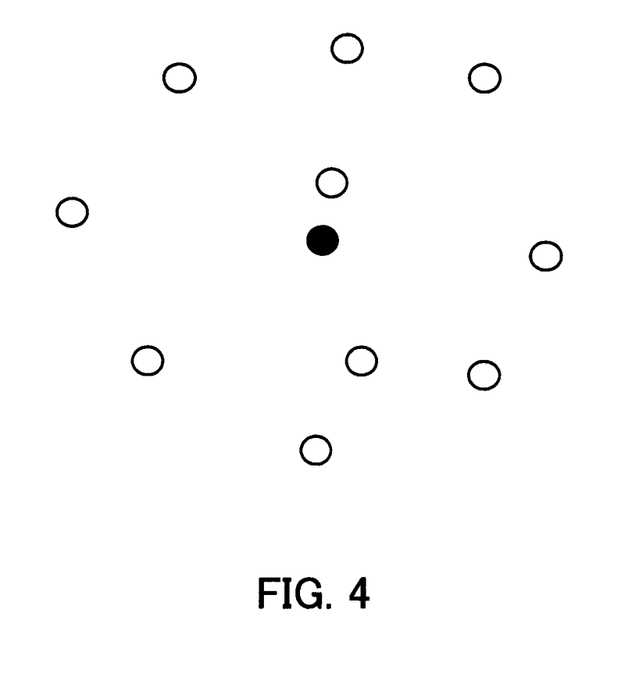
FIG. 4 is a view useful in explaining a latitude-longitude center.

FIG. 4 is a view useful in explaining a latitude-longitude center. White circles in FIG. 4 indicate ten samples of the latitude-longitude pair delivered from the latitude and longitude information-calculating section 21, while a black circle indicates the latitude-longitude center of the ten samples of the latitude-longitude pair calculated by the latitude-longitude center-calculating section 22.

The position of the mobile terminal 11 calculated based on the GPS signal contains an error in position (latitude and longitude). For example, even if the mobile terminal 11 remains at the same position, random latitude-longitude pairs as indicated by while circles in FIG. 4 can be calculated. To solve this problem, the latitude-longitude center-calculating section 22 calculates the center (indicated by the black circle in FIG. 4) from ten samples of the latitude-longitude center, to thereby increase the accuracy of the calculation of the actual position of the mobile terminal 11.

It should be noted that the latitude and longitude information-calculating section 21 calculates, as described hereinabove, the latitude-longitude pair of the mobile terminal 11 every 0.1 seconds, and whenever ten samples thereof (corresponding to one second) are calculated, deliver ten samples to the latitude-longitude center-calculating section 22. Therefore, the latitude-longitude center-calculating section 22 identifies the position of the mobile terminal 11 every one second.

Upon calculation of the predetermined number of centers of the latitude-longitude pair, the latitude-longitude center-calculating section 22 delivers the same to the distance-calculating section 23. For example, when the latitude-longitude center-calculating section 22 calculates 60 samples (corresponding to one minute) of the latitude-longitude center, it delivers the calculated 60 samples of the latitude-longitude center to the distance-calculating section 23.

The distance-calculating section 23 refers to the distance correction table 26 to acquire a distance covered by the actual position of the mobile terminal 11 (longitude-latitude pair) per one second.

Figure 5:
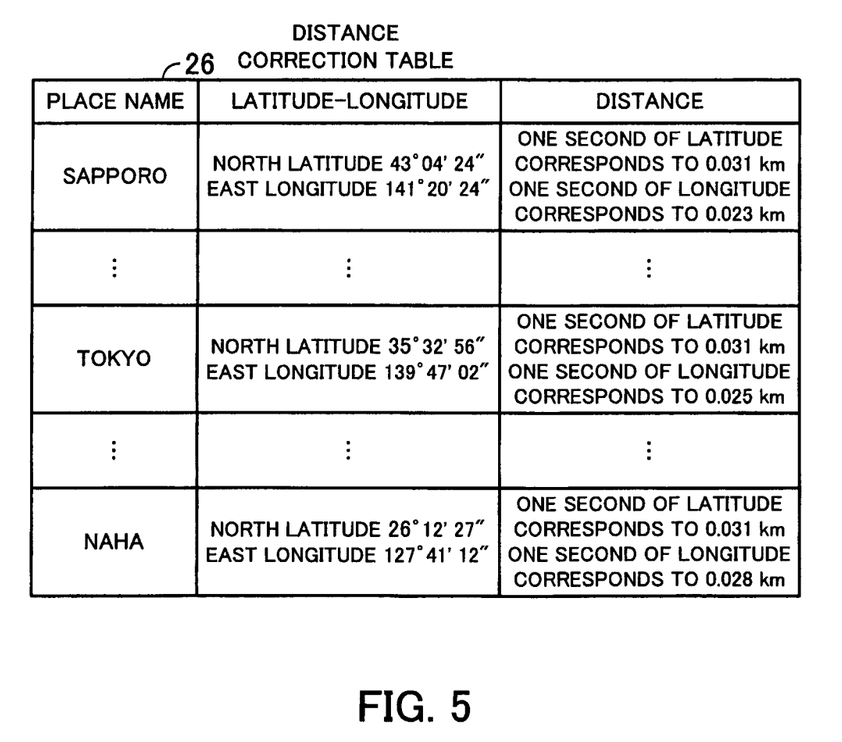
FIG. 5 is a view showing an example of the format of data in a distance correction table.

FIG. 5 is a view showing an example of the format of data in a distance correction table. In FIG. 5, each box of the column of a geographic position stores a place name where the mobile terminal 11 is located. Each box of a latitude-longitude pair stores information of the latitude-longitude pair of a place having the place name stored in the associated box of the place name. Each box of distance stores distances corresponding to one second of latitude and one second of longitude. For example, from the distance correction table 26 in FIG. 5, it is known that in Sapporo, the distance corresponding to one second of latitude is 0.031 km while the distance corresponding to one second of longitude is 0.023 km.

As shown in the distance correction table 26 in FIG. 5, the distance corresponding to each of one second of latitude and one second of longitude is different depending on the location of each place. Therefore, the distance calculating section 23 refers to the distance correction table 26 according to the latitude-longitude pair calculated by the latitude and longitude information-calculating section 21 to thereby acquire distances corresponding to one second of latitude and one second of longitude at the actual geographical position of the mobile terminal 11.

For example, the distance calculating section 23 receives ten samples of the latitude-longitude pair delivered from the latitude and longitude information-calculating section 21 in timing of delivery of 60 samples of the latitude-longitude center by the latitude-longitude center-calculating section 22 (every one minute of time). The distance calculating section 23 refers to the distance correction table 26 according to the latitude and longitude of the tenth sample of the received latitude-longitude pair, to acquire distances corresponding to one second of latitude and one second of longitude at a place where the mobile terminal 11 actually exists.

It should be noted that the distance calculating section 23 is not necessarily required to acquire distances corresponding to one second of latitude and one second of longitude by using the accurate latitude-longitude pair where the mobile terminal 11 exists. That is, the distance calculating section 23 is only required to acquire distances corresponding to one second of latitude and one second of longitude according to not the latitude-longitude pair center calculated by the latitude-longitude center-calculating section 22 but one of a predetermined number of latitude-longitude pairs calculated by the latitude and longitude information-calculating section 21. This is because it is impossible to think of the possibility of the user moving over such a long distance e.g. between adjacent cities in such a short time period.

However, in order to acquire distances corresponding to one second of latitude and one second of longitude at a position where the mobile terminal existed more recently, it is desirable to acquire the distances corresponding to one second of latitude and one second of longitude using the latest latitude-longitude pair (using the latitude-longitude pair at the current position of the mobile terminal 11). That is, it is desirable that the distance-calculating section 23 acquires the distances corresponding to one second of latitude and one second of longitude using the tenth sample of the latest ten samples of the latitude-longitude pair received from the latitude and longitude information-calculating section 21.

Further, the distance calculating section 23 receives a predetermined number of latitude-longitude centers from the latitude-longitude center-calculating section 22. The distance calculating section 23 calculates the differences in latitude and longitude between adjacent ones of the predetermined number of received latitude-longitude pairs, and calculates a distance between each adjacent pair of samples using the distances acquired from the distance correction table 26. Then, the distances between the samples are added up to thereby calculate a distance covered by the mobile terminal 11.

Figure 6:
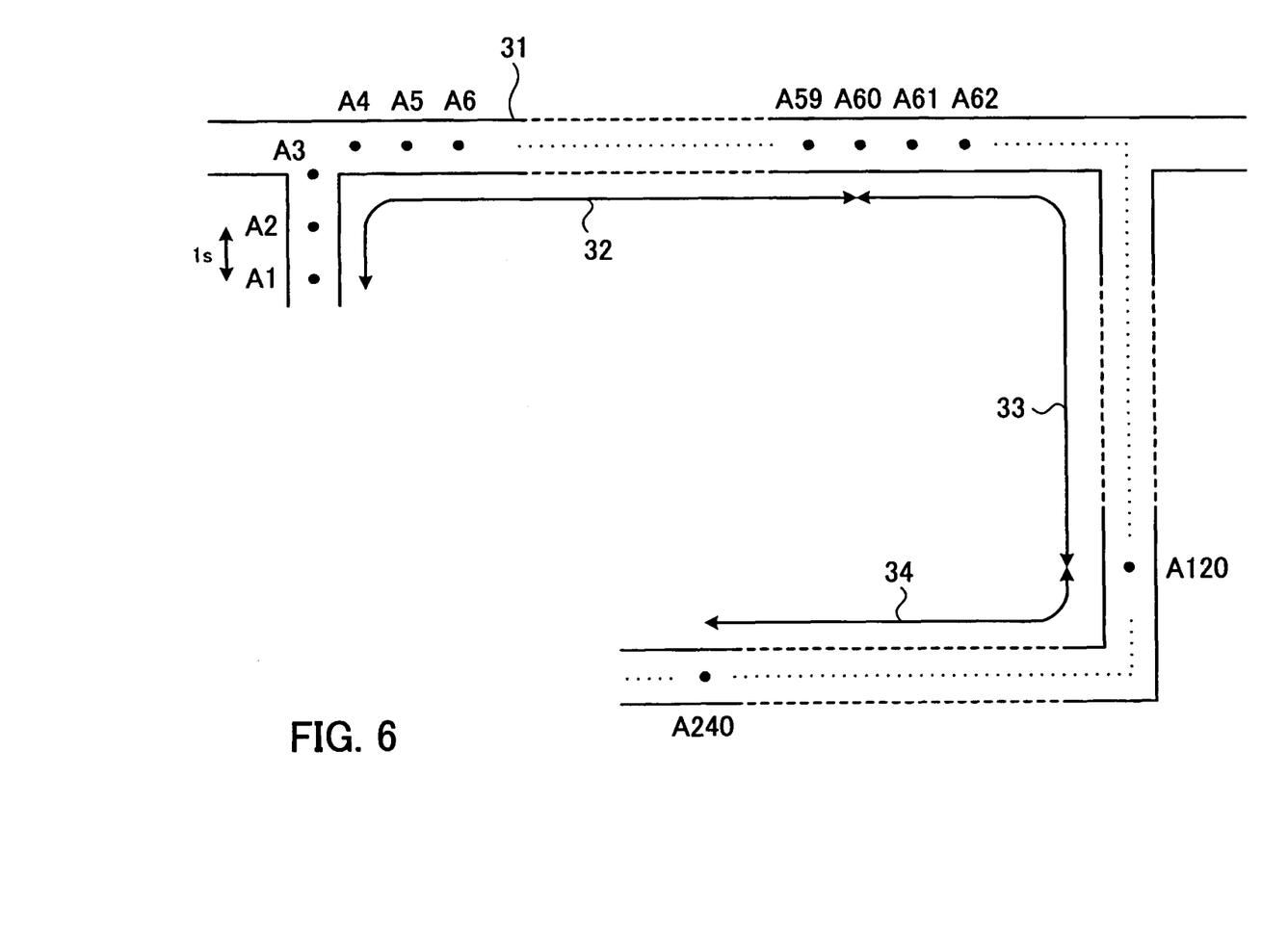
FIG. 6 is a view useful in explaining how a distance calculating section calculates a distance.

FIG. 6 is a view useful in explaining how the distance calculating section 23 calculates a covered distance. In FIG. 6, there is shown a road 31 on which the user is walking. Black circles A1, A2, A3, A4, A5, A6, . . . , A59, A60, A61, A62, . . . , A120, . . . , A140 indicate positions (latitude-longitude centers) of the mobile terminal 11 calculated by the latitude-longitude center-calculating section 22.

As described hereinbefore, the latitude and longitude information-calculating section 21 calculates the latitude-longitude pair e.g. every 0.1 seconds. The latitude-longitude center-calculating section 22 uses ten samples (corresponding to one second) of the latitude-longitude pair calculated by the latitude and longitude information-calculating section 21 to calculate the latitude-longitude center thereof. Therefore, the latitude-longitude center-calculating section 22 calculates each of the positions of the mobile terminal 11 indicated by the black circles A1, A2, A3, A4, A5, A6, . . . , A59, A60, A61, A62, . . . , A120, . . . , A240, in the mentioned order every one second.

The distance-calculating section 23 receives a predetermined number of latitude-longitude centers from the latitude-longitude center-calculating section 22. For example, the distance calculating section 23 receives 60 samples of the latitude-longitude center (corresponding to one minute) which correspond to the black circles from A1 to A60.

The distance calculating section 23 calculates differences in latitude and longitude between adjacent ones of 60 samples of the latitude-longitude center received from the latitude-longitude center-calculating section 22. For example, the distance calculating section 23 calculates the differences in latitude and longitude between A2 and A1, the differences in latitude and longitude between A3 and A2, . . . , and the differences in latitude and longitude between A60 and A59.

The distance calculating section 23 also receives, as described above, ten samples of the latitude-longitude pair delivered from the latitude and longitude information-calculating section 21, when it receives the 60 samples of the latitude-longitude center. For example, the distance calculating section 23 receives ten samples of latitude-longitude pairs used in calculating the center positions of the black circle A60 from the latitude and longitude information-calculating section 21. The distance calculating section 23 refers to the distance correction table 26 using one (tenth one) of the ten samples of the received latitude-longitude pairs to acquire distances corresponding to one second of latitude and one second of longitude at the actual position of the mobile terminal 11.

The distance calculating section 23 multiplies the differences in latitude and longitude between samples by the respective distances corresponding to one second of latitude and one second of longitude acquired from the distance correction table 26, to thereby determine the distances between the samples. For example, the distance calculating section 23 calculates the distances between A2 and A2, between A3 and A2, . . . , and between A60 and A59. The distance calculating section 23 adds up the calculated distances between the samples to calculate a distance covered by the user (mobile terminal 11) for one minute. This causes the distance covered by the user for one minute to be calculated, as indicated by a double-headed arrow 32 in FIG. 6.

Similarly, thereafter, every one minute of time, the distance calculating section 23 calculates a distance covered by the user using 60 samples of the latitude-longitude center calculated by the latitude-longitude center-calculating section 22.

For example, as indicated by doubled-headed arrows 33 and 34 in FIG. 6, distances covered by the user every minute are calculated.

Although in the above description, the latitude-longitude center-calculating section 22 calculates a latitude-longitude center every minute of time, this is not limitative. However, if the repetition period of calculation of the latitude-longitude center is made longer, it can become impossible to properly grasp a path along which the user moved, which produces an error in the covered distance.

For example, in FIG. 6, if the repetition period of calculation of the latitude-longitude center is made longer, there can be a case in which in spite of an actual path of black circles A1, A2, A3, A4, A5 and A6, sampling is carried out at black circles A1 and A6 by omitting sampling at the black circles A2, A3, A4, and A5 in the path. This results in the calculation of a distance between the black circles A1 to A6, which produces an error in the distance covered by the user.

Therefore, it is preferable that latitude-longitude centers are calculated at a repetition period which enables a change in the direction of travel of the user to be grasped. For example, let it be assumed that the speed of walking of the user is 1.0 m/s. Since it cannot be imaged that the user changes the direction of travel at intervals of 2 m, it is desirable to calculate the latitude-longitude center within a period of two seconds or less.

Referring again to the description of FIG. 3, the step count-acquiring section 24 acquires the step count of the user every predetermined time period. The predetermined time period is made equal to a time period at intervals of which the distance calculating section 23 calculates the covered distance. For example, in the example of FIG. 6, the distance calculating section 23 calculates a distance covered by the user every one minute, and hence the step count-acquiring section 24 acquires a step count every one minute. It should be noted that the step count of the user can be acquired from the pedometer installed on the mobile terminal 11.

The step length-calculating section 25 receives a distance covered by the user for a predetermined time period from the distance calculating section 23, and receives a step count corresponding to the predetermined time period from the step count-acquiring section 24. The step count-calculating section 25 refers to the step length coefficient table 27 according to the step count of the user corresponding to the predetermined time period received from the step count-acquiring section 24, to thereby acquire a step length coefficient.

Figure 7:
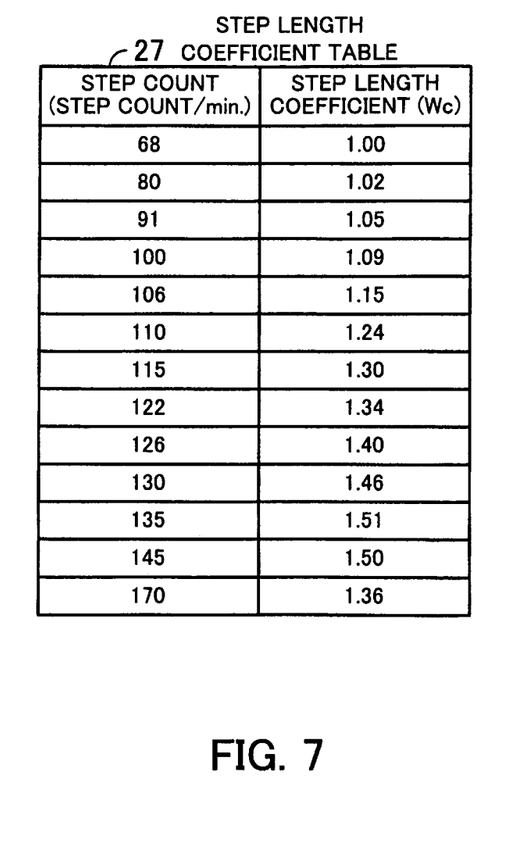
FIG. 7 is a view showing an example of the format of data in a step length coefficient table.

FIG. 7 is a view showing an example of the format of data in the step length coefficient table. Each box of the column of the step count in FIG. 7 stores a step count per minute. Each box of the column of the step length coefficient stores a step length coefficient for correcting the step length. For example, when the step count per minute of the user is 100, the step length coefficient to be corrected is 1.09 from the step length coefficient table 27 in FIG. 7.

If the step count per minute is large, it is considered that the user is traveling fast. As the user travels faster, the step length becomes larger. Therefore, as shown in the step length coefficient table 27 in FIG. 7, as the step length becomes larger, the value of the step length coefficient is set to be larger. It should be noted that if the step count per minute is not more than 68, the step length coefficient is set to 1.00

The step length-calculating section 25 calculates a step length of the user within a predetermined time period using the distance covered by the user for the predetermined time period, the step count, and the step length coefficient The step length-calculating section 25 calculates the step length of the user by the following equation:

$$S = D \div Wc \div Cw \quad (1)$$

wherein D represents a covered distance calculated by the distance calculating section 23 as a distance covered by the user for the predetermined time period, Wc a step length coefficient, and Cw a step count of the user acquired by the step count-acquiring section 24 as one per the predetermined time period.

For example, in FIG. 6, as indicated by the double-headed arrows 32, 33, and 34, the distance calculating section 23 calculates each of distances covered by the user, every one minute. The step count-acquiring section 24 also acquires a step count of the user every one minute. Therefore, the step length-calculating section 25 calculates the step length of the user every one minute using the equation (1).

After calculating the step length of the user every one minute, the step length-calculating section 25 sequentially adds a newly calculated step length to the preceding sum, and divides the total sum by the number of added step lengths. For example, let it be assumed that step lengths S1, S2, S3, . . . are sequentially calculated between sections designated by respective double-headed arrows 32, 33, 34, . . . in FIG. 6. In this case, the step length in a section designated by the double-headed arrow 32 is represented by the following equation:

$$S = S1 \div 1 \quad (2)$$

The average step length up to the section indicated by the double-headed arrow 33 is represented by the following equation:

$$S = (S1 + S2) \div 2 \quad (3)$$

Thus, the average step length up to an n-th section is represented by the following equation:

$$S = (S1 + S2 + \ldots + Sn) \div n \quad (4)$$

wherein Sn is a step length of the user calculated at the n-th section.

Thus, the mobile terminal 11 updates the average step length every predetermined time period. For example, in the example shown in FIG. 6, the step length of the user is updated every one minute.

The mobile terminal 11 calculates consumed calories and the amount of burned fat using the step length thus automatically calculated. Since the step length is updated e.g. every one minute, the consumed calories and the amount of burned fat displayed on the mobile terminal 11 are also updated every one minute. It should be noted that a section that calculates consumed calories and the amount of burned fat is not shown in FIG. 3.

Figure 8:
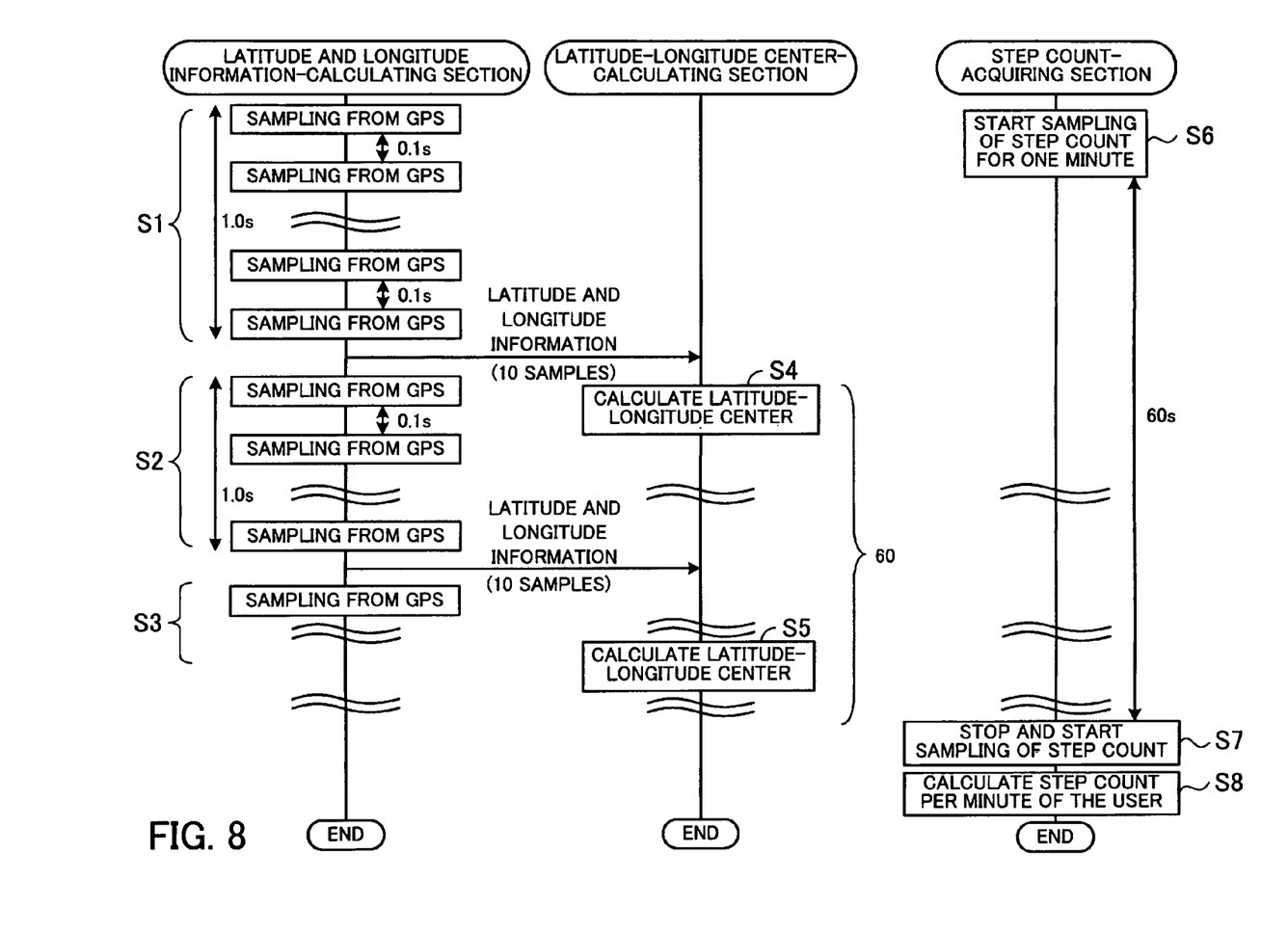
FIG. 8 is a sequence diagram of operations of the mobile terminal.

FIG. 8 is a sequence diagram of operations of the mobile terminal. In FIG. 8, there are shown sequences of operations of the latitude and longitude information-calculating section 21, the latitude-longitude center-calculating section 22, and the step count-acquiring section 24.

As shown in steps S1 to S3, the latitude and longitude information-calculating section 21 receives the GPS signal at a repetition period of 0.1 seconds to calculate a latitude-longitude pair. After calculating ten samples of the latitude-longitude pair, the latitude and longitude information-calculating section 21 delivers them to the latitude-longitude center-calculating section 22. In other words, the latitude and longitude information-calculating section 21 delivers the ten samples of the latitude-longitude pair to the latitude-longitude center-calculating section 22 every one second. The latitude and longitude information-calculating section 21 repeatedly carries out the operation.

As shown in steps S4 and S5, the latitude-longitude center-calculating section 22 receives the ten samples of the latitude and longitude information from the latitude and longitude information-calculating section 21 every one second. The latitude-longitude center-calculating section 22 calculates a center of the ten samples of the latitude-longitude pair sent from the latitude and longitude information-calculating section 21, to thereby identify the position of the mobile terminal 11. The latitude-longitude center-calculating section 22 repeatedly carries out the process for identifying the position of the mobile terminal 11 every one second. This determines e.g. the black circles A1, A2, . . . , as shown in FIG. 6.

As shown in a step S6, the step count-acquiring section 24 starts sampling of the step count of the user for one minute, in synchronism with the start of the calculation of the latitude-longitude pair by the latitude and longitude information-calculating section 21.

As shown in a step S7, the step count-acquiring section 24 stops sampling of the step count of the user for the one minute, and starts sampling of the step cont for a next one minute.

It should be noted that while the step count-acquiring section 24 samples the step count of the user for one minute, the latitude-longitude center-calculating section 22 calculates 60 samples of the position of the mobile terminal 11. After calculating 60 samples of the latitude-longitude center, the latitude-longitude center-calculating section 22 delivers these to the distance calculating section 23.

In a step S8, the step count-acquiring section 24 determines the step count per minute of the user from the step count acquired between the steps S6 and S7.

It should be noted that the latitude and longitude information-calculating section 21, the latitude-longitude center-calculating section 22, and the step count-acquiring section 24 repeatedly carry out the above-described operations. This determines e.g. the positions of the mobile terminal 11 and the step count of the user in the section indicated by the double-headed arrow 33 in FIG. 6, and then determines the positions of the mobile terminal 11 and the step count of the user in the section indicated by the double-headed arrow 34 in FIG. 6.

Figure 9:
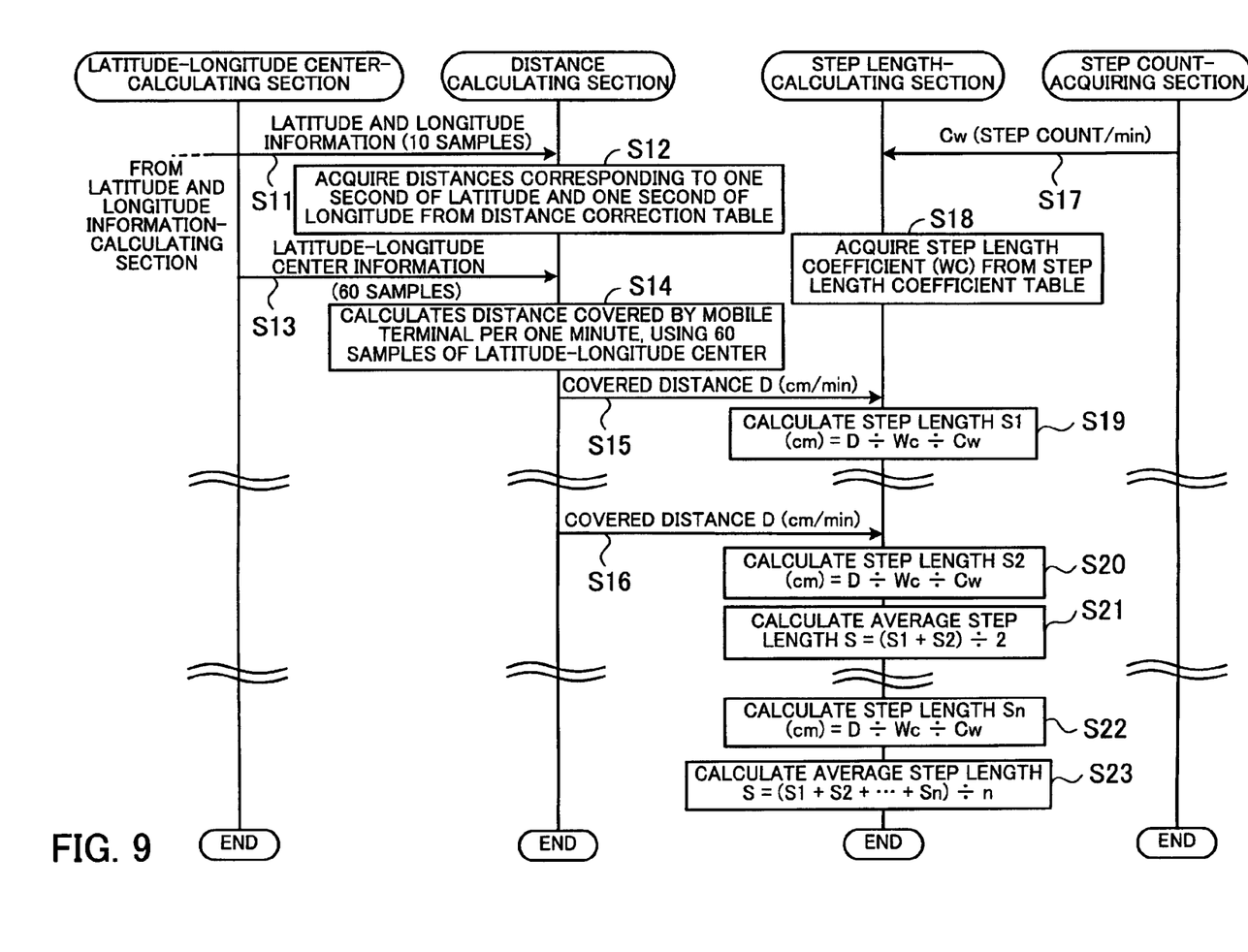
FIG. 9 is a sequence diagram of operations of the mobile terminal.

FIG. 9 is a sequence diagram of operations of the mobile terminal. In FIG. 9, there are shown sequences of operations of the latitude-longitude center-calculating section 22, the distance calculating section 23, the step count-acquiring section 24, and the step length-calculating section 25.

As shown in a step S11, the distance calculating section 23 receives ten samples of the latitude-longitude pair delivered from the latitude and longitude information-calculating section 21, every one minute of time. That is, the distance calculating section 23 receives ten samples of latitude-longitude pairs delivered from the latitude and longitude information-calculating section 21 in timing of delivery of 60 samples (per minute) of the latitude-longitude center delivered from the latitude-longitude center-calculating section 22.

It should be noted that since the latitude-longitude center-calculating section 22 receives ten samples of the latitude-longitude pair delivered from the latitude and longitude information-calculating section 21 to calculate a latitude-longitude center, the distance calculating section 23 may be configured to receive the ten samples of the latitude-longitude pair calculated by the latitude and longitude information-calculating section 21 by way of the latitude-longitude center-calculating section 22.

As shown in a step S12, the distance calculating section 23 refers to the distance correction table 26 according to a tenth one of the ten samples of the latitude-longitude pair received from the latitude and longitude information-calculating section 21 to acquire distances corresponding to one second of latitude and one second of longitude.

As shown in a step S13, the distance calculating section 23 receives 60 samples of the latitude-longitude center from the latitude-longitude center-calculating section 22. It should be noted that the latitude-longitude center-calculating section 22 calculates a latitude-longitude center every one second of time as mentioned in the steps 84 and S5 in FIG. 8, and hence the distance calculating section 23 receives 60 samples of latitude-longitude centers every one minute of time.

As shown in a step S14, the distance calculating section 23 calculates a distance covered by the mobile terminal 11 per minute of time, using the 60 samples of the latitude-longitude center. For example, in FIG. 6, the distance calculating section 23 calculates differences in latitude and longitude between respective positions indicated by the black circles A2 and A1, those indicated by the black circles A3 and A2, . . . , those indicated by the black circles A60 and A59. Then, the distance calculating section 23 calculates a distance between each pair of adjacent samples based on the distance corresponding to one second of latitude and one second of longitude acquired in the step S12. The distance calculating section 23 adds up the distances between the samples to thereby calculate a distance covered by the mobile terminal 11 for one minute of time.

As shown in a step S15, the distance calculating section 23 delivers a covered distance/minute D covered by the mobile terminal 11 for one minute to the step length-calculating section 25.

As shown in a step S16, the distance calculating section 23 delivers the covered distance/minute D covered by the mobile terminal 11 to the step length-calculating section 25. It should be noted that the distance calculating section 23 performs the same processing as in the steps S11 to S14, to calculate the covered distance/minute D covered by the mobile terminal 11.

As shown in a step S17, the step count-acquiring section 24 delivers a step count/minute Cw of the user to the step length-calculating section 25.

As shown in a step S18, the step length-calculating section 25 refers to the step length coefficient table 27 according to the step count/minute Cw delivered from the step count-acquiring section 24 to acquire a step length coefficient Wc. The step length-calculating section 25 repeats the process for acquiring the step length coefficient Wc every one minute.

As shown in a step S19, the step length-calculating section 25 calculates a step length S1 of the user based on the covered distance/minute D sent from the distance calculating section 23 in the step S15, the step count/minute Cw sent from the step count-acquiring section 24 in the step S17, and the step length coefficient Wc acquired in the step S18 by using the equation (1). This causes the step length-calculating section 25 to calculate a step length in the section indicated by the double-headed arrow 32 in FIG. 6.

It should be noted that the step length calculated first need not be calculated by averaging using the equation (4), because the equation (4) gives S=S1 when n=1 holds.

Further, the step length S calculated by the step length-calculating section 25 is used for calculating consumed calories and the amount of burned fat. The consumed calories and the amount of burned fat thus calculated are displayed on the display section of the mobile terminal 11.

As shown in a step S20, the step length-calculating section 25 calculates a step length S2 of the user based on the covered distance/minute D sent from the distance calculating section 23, the step count/minute Cw sent from the step count-acquiring section 24, and the step length coefficient Wc acquired by referring to the step length coefficient table 27, by using the equation (1). This causes the step length-calculating section 25 to calculate a step length in the section indicated by the double-headed arrow 33 in FIG. 6.

It should be noted that the covered distance/minute D is delivered from the distance calculating section 23 every one minute. The step count/minute Cw is delivered from the step count-acquiring section 24. The step length coefficient Wc is updated by referring to the step length coefficient table 27 according to the step count/minute Cw updated every one minute.

As shown in a step S21, the step length-calculating section 25 calculates an average step length S of the user by substituting the step length S1 of the user calculated in the step S19 and the step length S2 of the user calculated in the step S20 into the equation (4) (n=2).

It should be noted that the average step length S calculated by the step length-calculating section 25 is used in calculating consumed calories and the amount of burned fat. The consumed calories and the amount of burned fat thus calculated are displayed on the display section of the mobile terminal 11, thus updating the preceding consumed calories and the preceding amount of burned fat displayed thereon.

As shown in a step S22, the step length-calculating section 25 calculates a step length Sn of the user based on the covered distance/minute D sent from the distance calculating section 23, the step count/minute Cw sent from the step count-acquiring section 24, and the step length coefficient Wc acquired by referring to the step length coefficient table 27, by using the equation (1).

As shown in a step S23, the step length-calculating section 25 calculates an average step length S of the user by substituting the step lengths S1, S2, . . . Sn of the user calculated in the step S19 et seq. into the equation (4).

It should be noted that the average step length S calculated in the step length-calculating section 25 is used for calculating the consumed calories and the amount of burned fat. The consumed calories and the amount of burned fat thus calculated are displayed on the display section of the mobile terminal 11, thus updating the preceding consumed calories and the preceding amount of burned fat displayed thereon.

Thus, the mobile terminal 11 automatically calculates the step count of the user and the position of the mobile terminal 11. Then, the mobile terminal 11 calculates a center position close to an actual position of the mobile terminal 11, from a plurality of calculated positions of the same, and calculates a distance covered by the mobile terminal based on thus calculated center positions. This makes it possible for the mobile terminal 11 to automatically calculate the step length of the user with accuracy.

Further, since the covered distance and step length thus calculated are corrected using the distance correction table 26 and the step length correction table 27, the step length of the user can be accurately calculated.

Further, as shown in the equation (4), the mobile terminal 11 calculates the sum of calculated step lengths by sequentially adding a newly calculated step length to the preceding sum, and divides the total sum by the number of step lengths added up to thereby make the calculated step length close to an accurate one.

It should be noted that the above-described processing functions can be realized by a program. In this case, the details of processing by the functions which the mobile terminal 11 should have may be stored in the form of a computer-executable program in a portable storage medium, such as a CD-ROM (Compact Disk Read Only Memory) and a flexible disk, for distribution, or the computer-executable program may be stored in a storage device of a computer connected to a network to thereby enable the program to be transferred to the mobile terminal 11 via the network. The mobile terminal 11 can realize the above-described processing functions by executing the program stored in its memory.

The mobile terminal and method disclosed herein makes it possible to automatically calculate a step length of a user with accuracy.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mobile terminal for calculating consumed calories of a user, comprising:
   a pedometer to acquire a step count of the user;
   a Global Positioning System (GPS) receiver to acquire a position of the mobile terminal by receiving a radio signal from an external device; and
   a processor configured to perform a procedure including:
      calculating, at a predetermined repetition period, a distance covered by the mobile terminal on the basis of a plurality of the positions acquired by the GPS receiver;
      calculating, at the predetermined repetition period, a step length based on the step count acquired by the pedometer and the covered distance that is calculated;
      correcting the calculated step length according to the step count by using a step length coefficient obtained from a step length correction table that defines a plurality of combinations of step count and step length coefficient such that the step length coefficient increases as the step count increases;
      calculating an average step length by averaging a plurality of step lengths calculated and corrected throughout all the repetition periods, from a first repetition period up to a latest repetition period; and
      calculating consumed calories, using the average step length that is automatically calculated.

2. The mobile terminal according to claim 1, wherein the calculating an average step length sequentially adds up the step lengths that are calculated and corrected, and divides a sum of the step lengths by a number of step lengths that have been added up.

3. The mobile terminal according to claim 1, wherein the covered distance covered by the mobile terminal is calculated by calculating distances between adjacent pairs of a plurality of center positions, and adding up the distances.

4. The mobile terminal according to claim 1, further comprising a distance correction table for correcting the covered distance according to the position of the mobile terminal.

5. A computer executable program stored in a non-transitory computer readable medium for causing a computer in a mobile terminal to calculate consumed calories of a user, wherein the program causes the computer to perform a procedure comprising:
   acquiring a step count of the user;
   acquiring a position of the mobile terminal by receiving a radio signal from an external device;
   calculating, at a predetermined repetition period, a distance covered by the mobile terminal on the basis of a plurality of the positions that are acquired;

calculating, at the predetermined repetition period, a step length based on the step count and the covered distance;

correcting the calculated step length according to the step count by using a step length coefficient obtained from a step length correction table that defines a plurality of combinations of step count and step length coefficient such that the step length coefficient increases as the step count increases;

calculating an average step length by averaging a plurality of step lengths calculated and corrected throughout all the repetition periods, from a first repetition period up to a latest repetition period; and calculating consumed calories by using the average step length that is automatically calculated.

6. A method executed by a mobile terminal to calculate consumed calories of a user, the method comprising:

acquiring a step count of the user;

acquiring a position of the mobile terminal by receiving a radio signal from an external device;

calculating, at a predetermined repetition period, a distance covered by the mobile terminal on the basis of a plurality of the positions that are acquired;

calculating, at the predetermined repetition period, a step length based on the step count and the covered distance;

correcting the calculated step length according to the step count by using a step length coefficient obtained from a step length correction table that defines a plurality of combinations of step count and step length coefficient such that the step length coefficient increases as the step count increases;

calculating an average step length by averaging a plurality of step lengths calculated and corrected throughout all the repetition periods, from a first repetition period up to a latest repetition period; and calculating consumed calories by using the average step length that is automatically calculated.

* * * * *